Figure 1:
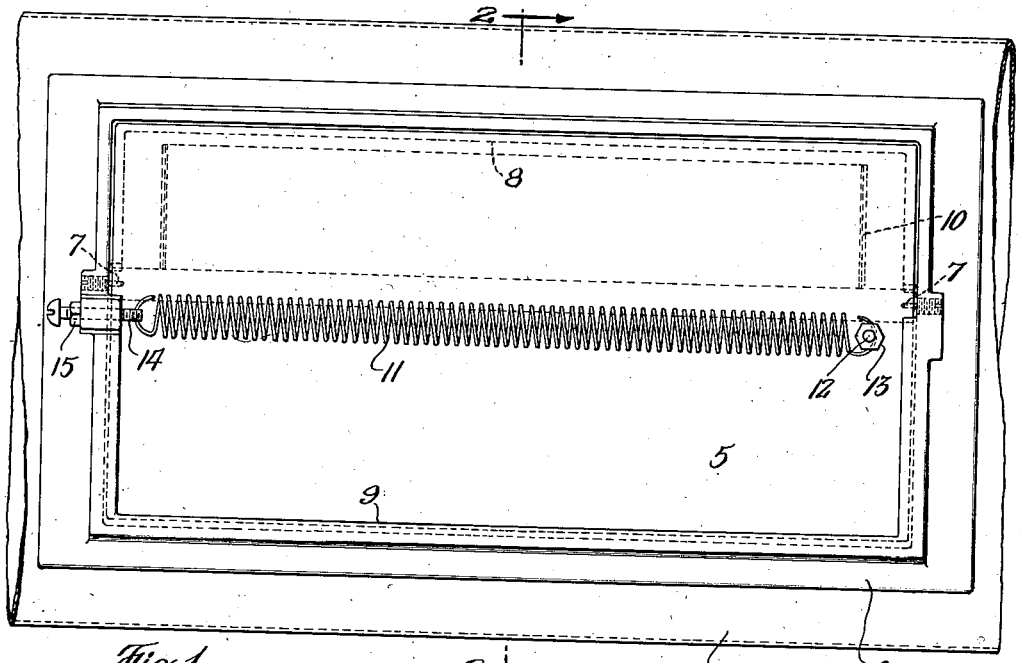

March 9, 1937.   H. M. CUNNINGHAM   2,073,386
DAMPER EQUIPMENT
Filed April 15, 1935

INVENTOR
Hal M. Cunningham
BY
Synnestvedt + Lechner
ATTORNEYS

Patented Mar. 9, 1937

2,073,386

UNITED STATES PATENT OFFICE 2,073,386

DAMPER EQUIPMENT

Hal M. Cunningham, Portland, Oreg.

Application April 15, 1935, Serial No. 16,284

2 Claims. (Cl. 236—45)

This invention relates to damper equipment and is concerned with a damper which is automatically operative under the influence of draft conditions to vary the damping effect.

The nature, objects and advantages of the invention will be understood to best advantage following the description of the accompanying drawing which illustrates the preferred embodiment of the invention. In the drawing—

Figure 2:
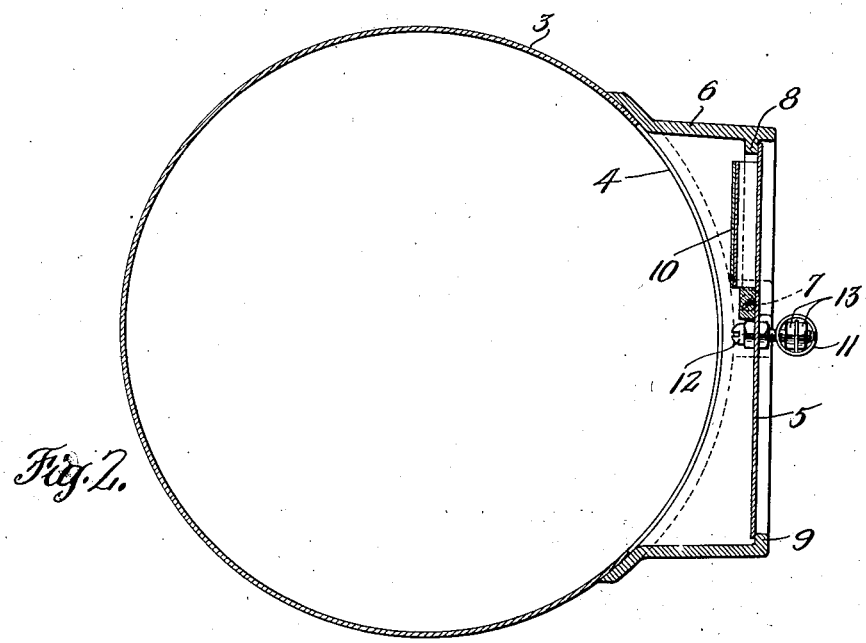

Figure 1 is a side elevational view of a flue pipe having my improved damper applied thereto; and Figure 2 is a cross-section taken substantially on the line 2—2 of Figure 1.

In the two figures of the drawing, the numeral 3 indicates the flue pipe, this pipe having an aperture 4 formed therein with which the damper equipment is associated. The damper itself may take any convenient shape, although in the present case I have illustrated the invention as incorporated in a damper employing a substantially rectangular gate or "flutter" 5. This gate is mounted in a frame 6 adapted to be secured to the flue 3 around the opening 4 therein. The gate is pivotally mounted as by means of pivot pins 7—7, the pivot axis being offset from the center of the damper so as to provide greater area at one side of the axis than at the other. In the present embodiment, the area of the damper below the pivot axis is of greater extent than above in view of which, under the influence of draft action, the damper will be caused to swing inwardly at the bottom to an open position. The frame 6 may be provided with flanges 8 and 9 adjacent the top and bottom of the gate and serving as stops to limit closing movement of the damper.

Heretofore dampers of this general type have been so weighted that the action of gravity tends to close the damper and thus always opposes the action of the draft. Prior dampers of this type have a number of disadvantages, two of the more important of which are mentioned below. In the first place, because of the reliance upon the action of gravity to effect closing movement of the gate, the damper may be mounted in only one position. If its position were to be shifted about the circumference of the flue, the action of gravity would be changed. One of the primary objects of the present invention is to provide a damper which overcomes this difficulty and which may, therefore, be mounted in any position.

Secondly, the prior type of damper, relying on a certain critical weight balance and gravity, provides maximum force tending to close the damper at that time when the damper is wide open and, conversely, minimum force tending to close the damper when the gate approximates closed position. The action of the draft on the unequal area at opposite sides of the pivot axis, however, is just the reverse, i. e., the draft action is at a maximum at the time when the gate is closed and at a minimum when the gate is in full open position. This, of course, produces undesirable draft conditions and inefficient operation, and another important object of the invention is to provide an arrangement wherein the force tending to close the damper is substantially uniform from full closed to full open position. With the foregoing purposes in mind, I employ a damper of the general type described above but, instead of providing an out-of-balance weight condition, I preferably weight the gate in such manner that an approximately balanced condition is produced. This may be done as by applying a weight 10 to the gate at the side of the pivot axis having smaller area.

In addition to the above, I employ some means such as the considerably elongated coil spring 11 for imposing a closing force on the gate. This spring is attached at one end to the gate in any convenient manner as by the bolts 12 and nuts 13. At its other end the spring is attached to an adjusting screw 14 tapped into a portion of the supporting frame 6 and having a lock nut 15.

In this way, i. e., by employing a spring reacting in torsion, I secure substantially uniform closing action from full open to full closed position of the gate. This condition is provided, moreover, regardless of the position in which the damper is mounted. The screw 14 provides a highly effective and convenient adjustment means for the spring reaction, in view of which adjustment may be made to meet the operating conditions encountered.

I claim:

1. In combination with an apertured flue, a damper including a gate, a pivot mounting the gate in the flue aperture, the axis of the pivot being offset from the center of the gate area to provide for movement of the gate toward open position under the influence of air entering the flue through its aperture, and a torsion spring reacting on the damper substantially about the axis of the pivot to urge the damper toward closed position, the gate being in substantial weight balance about its axis and the spring being of the multi-coil type, of extended length and light weight to provide minimum fluctuation in the closing force thereof as between full open and full closed positions of the gate.

2. In combination with an apertured flue, a damper including a gate, a pivot mounting the gate in the flue aperture on an axis located to provide differential gate areas at opposite sides thereof, the gate further being arranged for movement on its pivot toward open position under the influence of air entering the flue through its aperture, the gate being counterbalanced to a condition of approximate weight balance about the pivot axis, and spring means reacting against the gate and urging the gate to move on its pivot toward closed position, the force of reaction of the spring being substantially uniform throughout the range of gate movement between full open and full closed positions.

HAL M. CUNNINGHAM.